(12) United States Patent
Keßler et al.

(10) Patent No.: US 11,578,523 B2
(45) Date of Patent: Feb. 14, 2023

(54) MODULAR, MOTORIZED DRIVE SYSTEM, MODULE, USE AND PRODUCTION METHOD THEREFOR

(71) Applicant: STABILUS GMBH, Koblenz (DE)

(72) Inventors: Jonathan Keßler, Großholbach (DE); Danniel Lange, Waldesch (DE); Kathrin Kronz, Mittelstrimmig (DE); Axel Knopp, Eitelborn (DE)

(73) Assignee: STABILUS GMBH, Koblenz (DE)

( * ) Notice: Subject to any disclaimer, the term of this patent is extended or adjusted under 35 U.S.C. 154(b) by 305 days.

(21) Appl. No.: 16/760,224

(22) PCT Filed: Oct. 30, 2018

(86) PCT No.: PCT/EP2018/079728
§ 371 (c)(1),
(2) Date: Apr. 29, 2020

(87) PCT Pub. No.: WO2019/086467
PCT Pub. Date: May 9, 2019

(65) Prior Publication Data
US 2020/0332584 A1 Oct. 22, 2020

(30) Foreign Application Priority Data
Nov. 3, 2017 (DE) ..................... 10 2017 125 681.4

(51) Int. Cl.
*E05F 15/00* (2015.01)
*E05F 15/622* (2015.01)
*H02K 7/10* (2006.01)

(52) U.S. Cl.
CPC ............. *E05F 15/622* (2015.01); *H02K 7/10* (2013.01); *E05Y 2201/21* (2013.01);
(Continued)

(58) Field of Classification Search
CPC ........ F16B 7/22; F16B 21/088; F16H 57/033; E05F 15/622; E05Y 2201/434;
(Continued)

(56) References Cited

U.S. PATENT DOCUMENTS 6,305,050 B1 * 10/2001 Imai ....................... G06F 1/1616
16/334
6,772,481 B2 * 8/2004 Oshima ............... H04M 1/0216
16/297

(Continued)

FOREIGN PATENT DOCUMENTS

CN     1771422 A    5/2006
CN     2884972 Y    4/2007
(Continued)

OTHER PUBLICATIONS

International Search Report for PCT/EP2018/079728 dated Mar. 29, 2019.

*Primary Examiner* — Chi Q Nguyen
(74) *Attorney, Agent, or Firm* — Schmeiser, Olsen & Watts, LLP

(57) ABSTRACT

A module for a modular, motorized drive system, in particular for doors, wherein the modular system is designed such that a number of modules arranged linearly one behind the other along a longitudinal axis of the modular system form a functional group of the drive system is provided. The modular system includes at least one of a number of latching elements on a front side of the module orthogonal to the longitudinal axis and a number of receiving elements, which are complementary to the latching elements, on a rear side of the module orthogonal to the longitudinal axis and opposite the front side, wherein the receiving elements are designed to form a mechanical connection to the latching
(Continued)

elements of a further module which is arranged with its front side parallel to the rear side of the module.

13 Claims, 5 Drawing Sheets

(52) U.S. Cl.
CPC ... *E05Y 2201/236* (2013.01); *E05Y 2201/434* (2013.01); *E05Y 2201/604* (2013.01); *E05Y 2900/531* (2013.01)

(58) Field of Classification Search
CPC ......... E05Y 2800/244; E05Y 2900/531; E05Y 2201/604; E05Y 2800/23; E05Y 2600/53; E05Y 2800/28; E05Y 2201/21; E05Y 2201/236; E05Y 2800/205; H02K 7/10
See application file for complete search history.

(56) References Cited

U.S. PATENT DOCUMENTS

| | | | | |
|---|---|---|---|---|
| 7,043,798 B2 * | 5/2006 | Huang | ................ | H04M 1/0216 |
| | | | | 16/303 |
| 7,386,918 B2 * | 6/2008 | Tomizawa | ............ | G06F 1/1681 |
| | | | | 16/303 |
| 9,822,843 B2 * | 11/2017 | Eberle | ................... | F16H 57/029 |
| 11,248,405 B2 * | 2/2022 | Schmengler | ........ | F16D 69/0408 |
| 2003/0009851 A1 * | 1/2003 | Oshima | ................. | G06F 1/1679 |
| | | | | 16/334 |
| 2013/0040777 A1 | 2/2013 | Gassmann et al. | | |
| 2013/0169087 A1 | 7/2013 | Kummer | | |
| 2017/0159753 A1 | 6/2017 | Eberle | | |
| 2018/0051777 A1 * | 2/2018 | Ta | ............ | B21K 1/30 |
| 2018/0051791 A1 * | 2/2018 | Ta | ............ | F16H 1/28 |
| 2018/0313123 A1 * | 11/2018 | Kenyon | ................ | E05D 11/087 |

FOREIGN PATENT DOCUMENTS

| | | |
|---|---|---|
| CN | 105940176 A | 9/2016 |
| DE | 202008015420 U1 | 2/2009 |
| DE | 102014212863 A1 | 1/2016 |
| EP | 1 940 012 A1 | 7/2008 |
| EP | 1 664 470 B1 | 8/2008 |
| EP | 2369125 A2 | 9/2011 |
| JP | 2013-534396 A | 9/2013 |
| JP | 2013-534997 A | 9/2013 |
| JP | 2015-161157 A | 9/2015 |
| WO | 0011372 A1 | 3/2000 |
| WO | 2005/021915 A1 | 3/2005 |
| WO | 2011057604 A1 | 5/2011 |

\* cited by examiner

MODULAR, MOTORIZED DRIVE SYSTEM, MODULE, USE AND PRODUCTION METHOD THEREFOR

CROSS-REFERENCE TO RELATED APPLICATIONS

This application claims priority to PCT Application No. PCT/EP2018/079728, having a filing date of Oct. 30, 2018, based on German Application No. 10 2017 125 681.4, having a filing date of Nov. 3, 2017, the entire contents both of which are hereby incorporated by reference.

FIELD OF TECHNOLOGY

The following relates to a module for a modular motorized drive system, in particular for doors, the module being designed for a number of modules arranged linearly one behind the other along a longitudinal axis of modules forming a functional group of the drive system. The following further relates to a modular, motorized drive system, in particular for doors, a number of modules arranged linearly one behind the other along a longitudinal axis of the modules, forming a functional group of the drive system. The following further relates to the use of a drive system according to the invention for operating a door, in particular a vehicle door. The following also relates to a production method for a modular, motorized drive system, in particular for doors.

BACKGROUND

Drive systems for, in particular electromechanical, control of, for example, doors, in particular vehicle doors and vehicle flaps, are known from the conventional art. A force of an electric motor is transmitted to the vehicle door, for example via a threaded spindle. Furthermore, the drive systems can comprise, for example, a clutch to protect the vehicle door, in particular a connection element of the drive system to the vehicle door, against overloading or to reduce vibrations, a brake for holding the vehicle door in a certain position, a transmission for adjusting the transmitted force and speed and/or a bearing for absorbing forces exerted by the vehicle door on the drive system.

A generic drive system is described for example in the document DE102014212863A1, the teaching of which, is included here by reference. DE102014212863A1 discloses a generic drive system and a specially designed brake in order to achieve a high degree of functionality and high energy efficiency.

Another generic drive system is described in document EP1940012A1, the teaching of which, is included here by reference. For a compact structure and a small noise development of the drive system EP1940012A1 suggests the use of a hysteresis brake for a generic drive system.

Another generic drive system is described in the document EP1664470B1, the teaching of which, is included here by reference. EP1664470B1 discloses a generic drive system and a reduced overall volume due to an exact mounting and axial guidance and alignment of the components of the drive system.

Another generic drive system is described in the document US20130169087A1, the teaching of which, is included here by reference. US20130169087A1 describes a generic drive system and a purely mechanical clutch for an automatic and reliable connection of a brake to the drive system.

Depending on the type of application, for example in terms of mass and/or opening direction of the vehicle door and/or the available installation volume, different drive systems are required, which differ, for example, in the opening force that can be applied or the opening speed that can be achieved. A manufacturer must therefore maintain a large number of different drive systems, which is expensive and time-consuming. The large number of quality inspection routines corresponding to the number of different drive systems prior to installation or delivery of the drive systems is particularly complex and difficult to standardize and therefore production and quality assurance costs are expensive.

SUMMARY

An aspect relates to a reliable, versatile and motorized drive system inexpensive to produce, for example for doors, in particular for vehicle doors.

A module according to embodiments of the invention for a modular, motorized drive system, for example, for doors, in particular vehicle doors, is designed so that a number of modules arranged linearly one behind the other along a longitudinal axis of the module forms a functional group of the drive system. The term "door" in the sense of embodiments of the invention encompasses any device for reversible closing or at least partially covering an access opening of a technical device or a building. In addition to doors for access by persons, the term "door" also includes, for example, doors at loading and/or unloading openings and/or ventilation openings, in particular also windows. A "vehicle door" in the sense of embodiments of the invention comprises, in addition to doors for the access of passengers to the vehicle, for example also trunk lids and bonnets or other surface sections of the vehicle to be opened, such as luggage flaps of a coach. For the purposes of embodiments of the invention, the term "vehicle" includes in particular land craft, watercraft and aircraft.

For doors in use, especially doors of industrial products such as vehicle doors produced in small to large series, a modular drive system has the particular advantage that it creates model security. For example, with model changes—which are becoming increasingly common in the vehicle industry—in a modular drive system, new drive systems adapted to new vehicle models can be assembled from modules that have already been tried and tested. In this way, development time and costs are reduced while the drive systems are highly reliable.

If the drive system is designed for doors of industrial devices, for example for a lid of a laboratory device, a modular drive system with standardized modules can advantageously also meet special requirements, for example with regard to the resistance of the drive system to extreme temperatures, chemicals and/or vibrations. For this purpose, standardized modules made of different materials can be used depending on the application.

Drive systems that are used to drive building doors or building windows, particularly roof windows, are usually produced in smaller numbers than in vehicle construction. A modular drive system offers the particular advantage that even small series can be produced cost-effectively, especially if several different series of drive systems are composed of the same modules.

The drive system can have at least one, in particular electromechanical, actuator, at least one spring, in particular a gas pressure spring, and/or at least one damper, especially an industrial shock absorber.

The modular structure of the function group has the advantageous effect that a few standardized modules can be assembled to form a module system, the module system being adaptable to a large number of applications and, at the same time, the individual modules being able to be separately tested for quality. The modular structure of such functional groups according to embodiments of the invention is unusual in the conventional art, but according to the knowledge according to embodiments of the invention is particularly advantageous because standardized examination steps for the individual modules can be carried out efficiently and still provide valid conclusions about the functionality of the module system assembled from modules. In addition, a functional error can be assigned to an individual module, which reduces the effort required for troubleshooting and/or rejects. This applies in particular to functional groups such as, in particular, electromechanical actuators, springs or dampers for vehicle doors, in which production costs and reliability have to be optimized at the same time.

The problem with a modular structure is the correct assembly and the interaction of the modules of a module system. The module according to embodiments of the invention can therefore have a number of latching elements on a front side of the module orthogonal to the longitudinal axis and/or a number of receiving elements complementary to the latching elements on a rear side of the module opposite the front side and orthogonal to the longitudinal axis. The receiving elements are designed to form a mechanical connection with the latching elements of a further module, which is arranged with its front side parallel to the rear side of the module. The modules can be securely connected to one another by the latching elements and receiving elements, for example to reliably transmit a driving force from a motor to a door. This makes it possible to combine different modules with one another in a variety of ways to form a versatile and reliable drive system.

For example, the latching elements can be a number of latching lugs, and the receiving elements can comprise a number of depressions complementary to the latching lugs. This configuration enables mechanical simple and safe connection.

The receiving elements of the module and the locking elements of the further module can be designed to cooperate positively along the longitudinal axis to prevent loosening of the mechanical connection. A form-fitting connection achieves a particularly reliable and stable connection which, in contrast to a pure force-fitting connection, does not depend on the chemical and/or topographical surface quality of the latching elements and/or receiving elements. A pure frictional connection can lead, for example, if the frictional forces between the latching elements and receiving elements are too low to unintentional loosening of the connection. By preventing unintentional or manipulative loosening of the connection, the reliability of the drive system is increased.

The latching elements and receiving elements can be designed to connect the modules to one another with mechanical play. The mechanical play makes it easier to assemble the modules to one another, in particular to make it easier to snap latching elements into receiving elements.

The latching elements and/or the receiving elements can in particular comprise at least one locking element against loosening of the mechanical connection along the longitudinal axis. The locking element can, for example, be designed as a locking bolt and/or comprise an undercut. If, for example, the latching elements and the receiving elements include undercuts that are complementary to one another, adjacent modules can be pushed together along the longitudinal axis until the latching elements engage with the undercuts of the receiving elements. Due to the undercuts, the modules can then no longer be separated along the longitudinal axis without destroying the latching elements and/or receiving elements. In this way, a particularly stable and reliable connection of the modules is achieved. Furthermore, the maximum axial load that the connection can withstand can be reliably predicted, since it depends only on the material properties and the shape of the latching elements and receiving elements and not on other factors such as surface properties or the presence of lubricants.

The module can comprise at least one separating element for the non-destructive disconnection of the mechanical connection. The separating element can, for example, be designed to deform the latching elements and/or receiving elements in a direction radial to the longitudinal axis, so that they can be separated from one another along the longitudinal axis. In the simplest case, the separating element can include, for example a control surface on an outside of a latching element or a receiving element, via which, for example, a radial force towards the longitudinal axis can be transferred to the latching element or receiving element. The radial force can be exerted manually or by a robot, for example. The separating element can be used to separate connected modules from one another without destroying them, for example to convert the drive system for a changed application or to replace a defective module. This makes the drive system particularly versatile and durable.

The module can comprise a cage for receiving components of the module. The cage can in particular comprise the latching elements and/or the receiving elements and/or be designed to absorb forces acting along the longitudinal axis. The components can comprise, for example, a functional group of the drive system or parts thereof. The components can be sensitive to mechanical loads, in particular along the longitudinal axis, against which the cage can protect the components. Furthermore, different modules can contain different components in a uniform cage. As a result, these modules are particularly easily interchangeable, for example to adapt the drive system to different requirements. The cage can be made for example of a plastic for low manufacturing costs, from a fibre-reinforced plastic for high mechanical stability with low weight or made of a metal or ceramic for particularly high mechanical stability.

The module can comprise at least one predetermined breaking point, in particular a breaking strength of the predetermined breaking point can be less than a loosening force along the longitudinal axis that must be applied to disconnect the module from the other module. The predetermined breaking point ensures that the module is destroyed in a defined manner before the modules are separated from one another. As a result, the permissible force acting on the module in the axial direction can be precisely defined, which increases the reliability of the drive system. Furthermore, the security against manipulation is increased, since the modules cannot be separated without being noticed after their connection in the drive system. The predetermined breaking point is advantageously arranged in the area of the latching elements or receiving elements, since there usually occur the highest material stresses and thus the force threshold from which the predetermined breaking occurs can be set more clearly and reliably.

The module can have a number of anti-rotation elements for securing the module, in particular on a housing of the modular drive system, against a rotary motion of the module about the longitudinal axis. Anti-rotation elements prevent the module from rotating in an uncontrolled manner, which is important, for example, for the function of a motor connected to the module or a brake connected to the module. A motor or a brake only function if parts thereof, for example via the module, in particular via a cage of the module, are arranged in a stationary manner, for example on a housing of the drive system.

The anti-rotation elements can in particular comprise a number of grooves and/or projections which engage, for example, in corresponding projections and/or grooves of the housing, the grooves and/or projections of the module can for example be arranged circumferentially with respect to the longitudinal axis on the module, in particular on a cage of the module, and/or extend in parallel to the longitudinal axis.

The functional group is selected, for example, from an engine; a transmission; a clutch; a brake; a bearing and a threaded spindle. The functional group can be designed in a manner known in the art, in particular as in one of the publications mentioned at the outset, in order to limit the costs of the drive system.

In a modular, motorized drive system according to embodiments of the invention, for example for doors, in particular for vehicle doors, a number of modules arranged linearly one behind the other along a longitudinal axis of the modules, in particular according to embodiments of the invention, form a functional group of the drive system.

Each of the modules of the drive system can have a number of latching elements on a front side orthogonal to the longitudinal axis and/or a number of receiving elements complementary to the latching elements on a rear side opposite to the front side and orthogonal to the longitudinal axis, the latching elements of a first module forming a mechanical connection with the receiving elements of a second module adjacent to the first module along the longitudinal axis. This results in the design options and advantages described above for the module according to embodiments of the invention.

A plurality of the modules, preferably all modules, of the drive system can match one another with regard to the shape and arrangement of the latching elements and receiving elements. As a result, the modules can be exchanged for one another in a particularly simple manner and/or can be arranged in a different order. In this way, for example, the drive system can be adapted to different requirements, in particular with regard to the required movement speed and/or force.

One of the modules of the drive system can comprise, for example, a threaded spindle and a bearing, the bearing preferably being designed to absorb forces acting along the longitudinal axis. During operation of the drive system, forces, for example a weight of a trunk lid, may act on the drive system via the threaded spindle along the longitudinal axis. Functional groups of the drive system, such as a transmission, can be damaged by such forces. It is therefore advantageous to provide a bearing for absorbing these forces. In particular, if the bearing is arranged directly on the threaded spindle, for example in a common module, additional functional groups of the drive can be effectively protected. This means that no further protective measures are required, and the other functional groups can be designed and arranged more freely, which increases the versatility of the drive system.

The following includes a use of a drive system according to embodiments of the invention for actuating a door, in particular a vehicle door. According to embodiments of the invention, the drive system can also be used to move other objects, for example to adjust the height of a table.

A production method according to embodiments of the invention for a modular, motorized drive system, in particular according to embodiments of the invention, for example for doors, in particular for vehicle doors, comprises at least the following steps:
a. Manufacturing of modules for the drive system;
b. Testing the function of the individual modules and
c. Assembling the modules after testing to the drive system.

The manufacturing of the modules, in particular according to embodiments of the invention, can comprise, for example, the customary production of functional groups of the drive system. The functional groups can advantageously be installed in a number of cages of the modules, the cages being produced, for example, by injection moulding, in particular from a plastic.

The manufacturing can include marking the modules with a mark that is individual for the respective specification of the module and/or for each individual module. The marking ensures that the appropriate modules are put together to form a drive system with a specific overall specification. Furthermore, the marking can allow for a traceability of the module and in particular a clear assignment of test results to the module. The marking can include, for example, a colour marking, an alphanumeric code, a bar code, a QR code and/or an RFID transponder.

In customary production methods, it is not possible to meaningfully test modules of a drive system before assembling them into the drive system. This is because the functional groups formed by the modules in the drive system are exposed to different loads, in particular axial loads, than before assembly, which can change the test results. In contrast, according to embodiments of the invention functional groups are decoupled from axial forces in the drive system; for example, in that the modules include cages for absorbing axial forces and/or in that a bearing for absorbing axial forces is arranged between the functional groups and the threaded spindle of the drive system.

If the modules are tested before assembly, the advantage is that modules that do not meet their specifications can be discarded before assembly. Since no complete drive systems fail because of individual modules that do not meet specifications, there is less waste, and the production method becomes more cost and time efficient.

The testing can include, for example, optical, in particular automatic, measuring methods, such as laser scanning.

The production method may include storing the modules after manufacture and before assembly for a period of time at a storing temperature. The storing period can advantageously be indefinite and/or adaptable and/or be at least 24 hours and/or the storing temperature can be above a glass transition temperature of a material of the modules.

If modules are stored prior to assembly, in particular over a longer period of time, for example longer than 24 hours, in particular latching elements and/or receiving elements for connecting the modules can deform by creeping of a material of the modules. This effect can occur in particular if the storing temperature is above a glass transition temperature of a material of the modules. This can prevent a reliable connection of the modules during assembly.

Storing the modules, in particular for an indefinite, adaptable and/or more than 24-hour storing period, is advantageous, however, so that modular drive systems for different requirements can be assembled from a large number of modules. This increases the versatility of the production method.

Storing is advantageously carried out at an uncontrolled ambient temperature in order to save costs and energy, for example for lowering the storing temperature below a glass transition temperature of a material of the modules. A reliable connection of the modules despite possible deformations during storing can be achieved according to embodiments of the invention, for example, by the receiving elements and the latching elements being designed to cooperate positively along the longitudinal axis against loosening of the mechanical connection. The latching elements and/or the receiving elements can in particular comprise at least one locking element against loosening of the mechanical connection along the longitudinal axis, for example at least one undercut.

Testing can be carried out before or after storing. If testing is carried out before storing, the advantage arises that no storing space is used by modules not in accordance with specifications, and that such modules can possibly be adapted to their specifications by post-processing before storing. If testing is carried out after storing, this has the advantage that possible changes, for example deformations due to creep, during storing, in particular during storing for an indefinite, adaptable and/or more than 24 hour storing period, are also recorded during the test.

Assembling can include preloading the modules. The modules are reliably connected to one another by preloading the modules, in particular by a compressive force along the longitudinal axis of the modules arranged linearly one behind the other along the longitudinal axis. In particular it is prevented that a mechanical play between the modules occurs along the longitudinal axis, which could hinder mechanical interaction of functional groups of the drive system. Furthermore, the preloading can also securely connect those modules which are designed such that the latching elements and receiving elements of the modules do not connect the modules without play. By providing play in the axial direction, the modules can be assembled more easily. Although the play is desirable for assembly, it does provide undesirable degree of translational movement in the axial direction for assembled functional groups. Therefore, according to embodiments of the invention, the functional groups and/or the entire module system consisting of modules are subjected to an axial pressure and/or are held with axial limiters, so that, despite the play, there is no degree of freedom of axial movement between the modules in such an operating configuration.

The drive system produced using the production method can be designed to actuate doors, in particular vehicle doors.

BRIEF DESCRIPTION

Some of the embodiments will be described in detail, with reference to the following figures, wherein like designations denote like members, wherein.

Figure 3A:
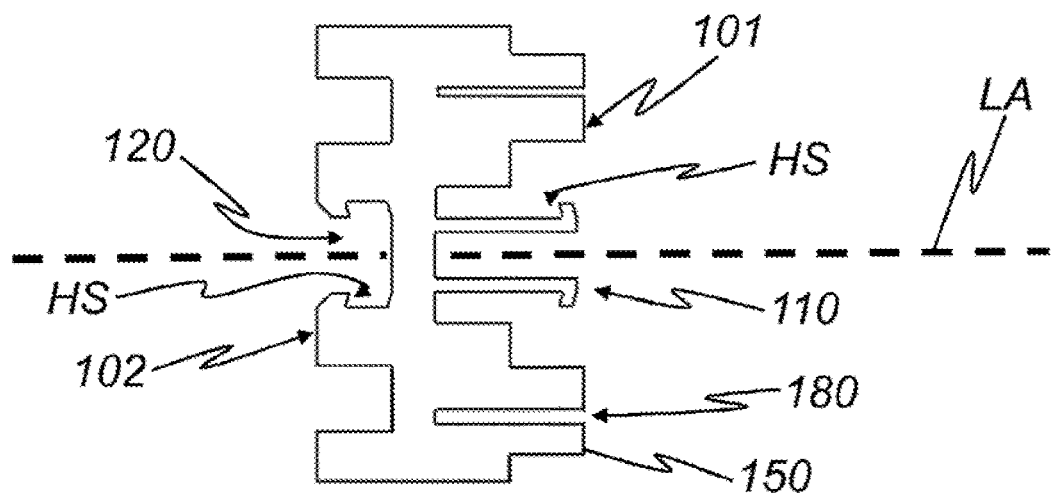
Figure 3B:
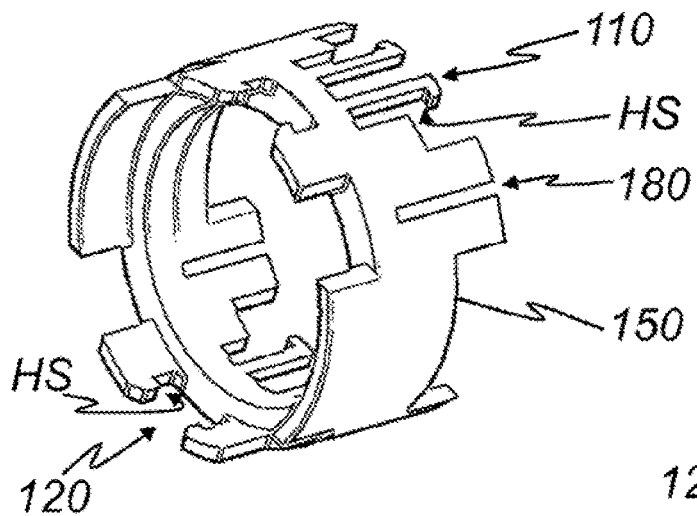
Figure 3C:
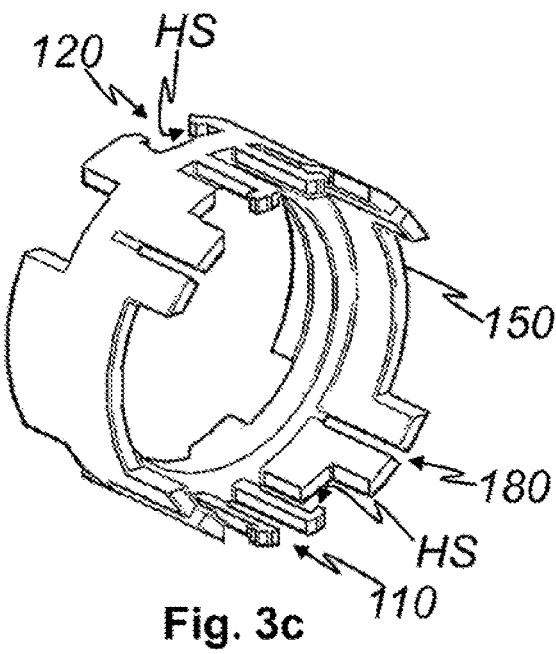
Figure 4A:
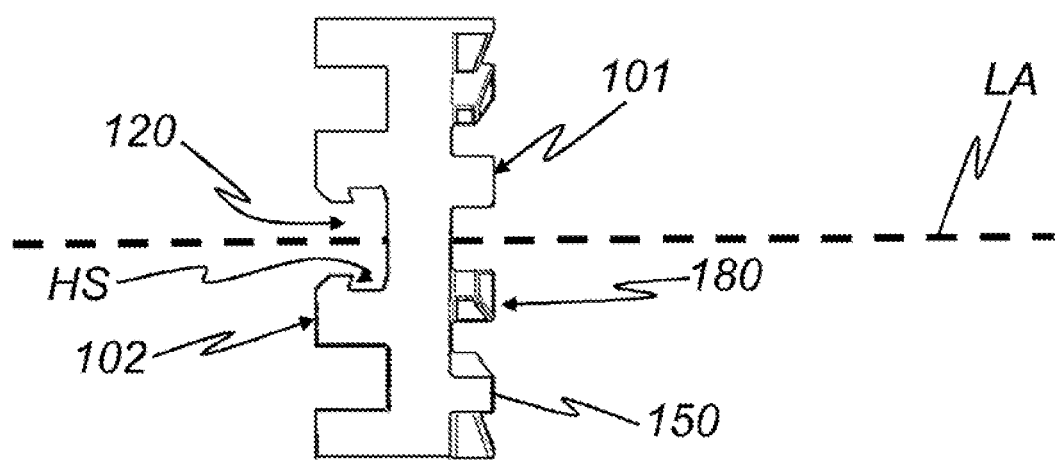
Figure 4B:
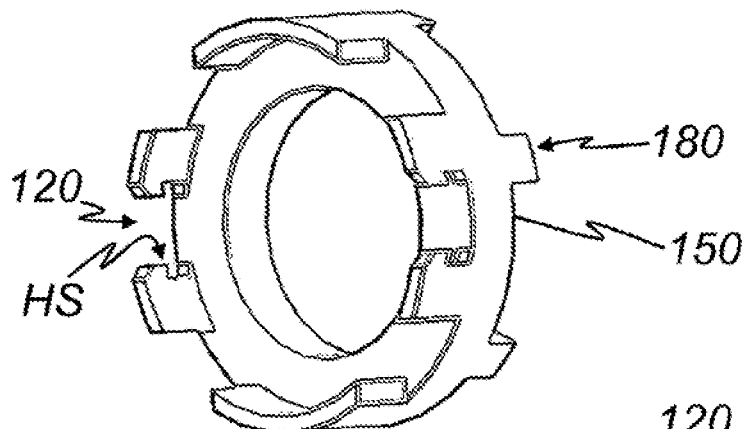
Figure 4C:
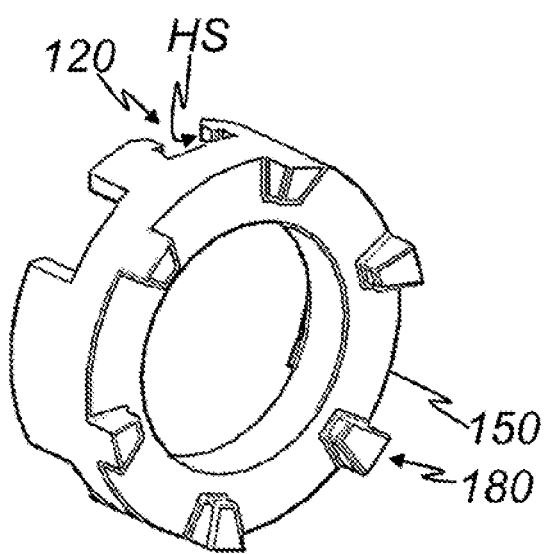
Figure 5:
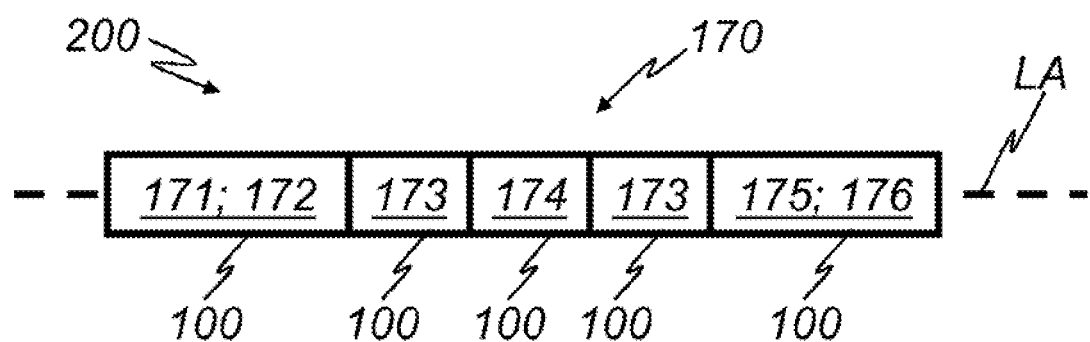
Figure 6:
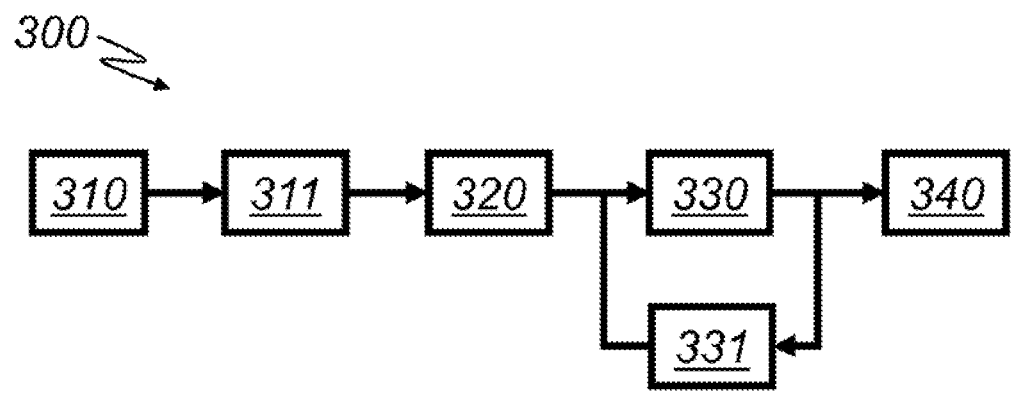
Figure 7:
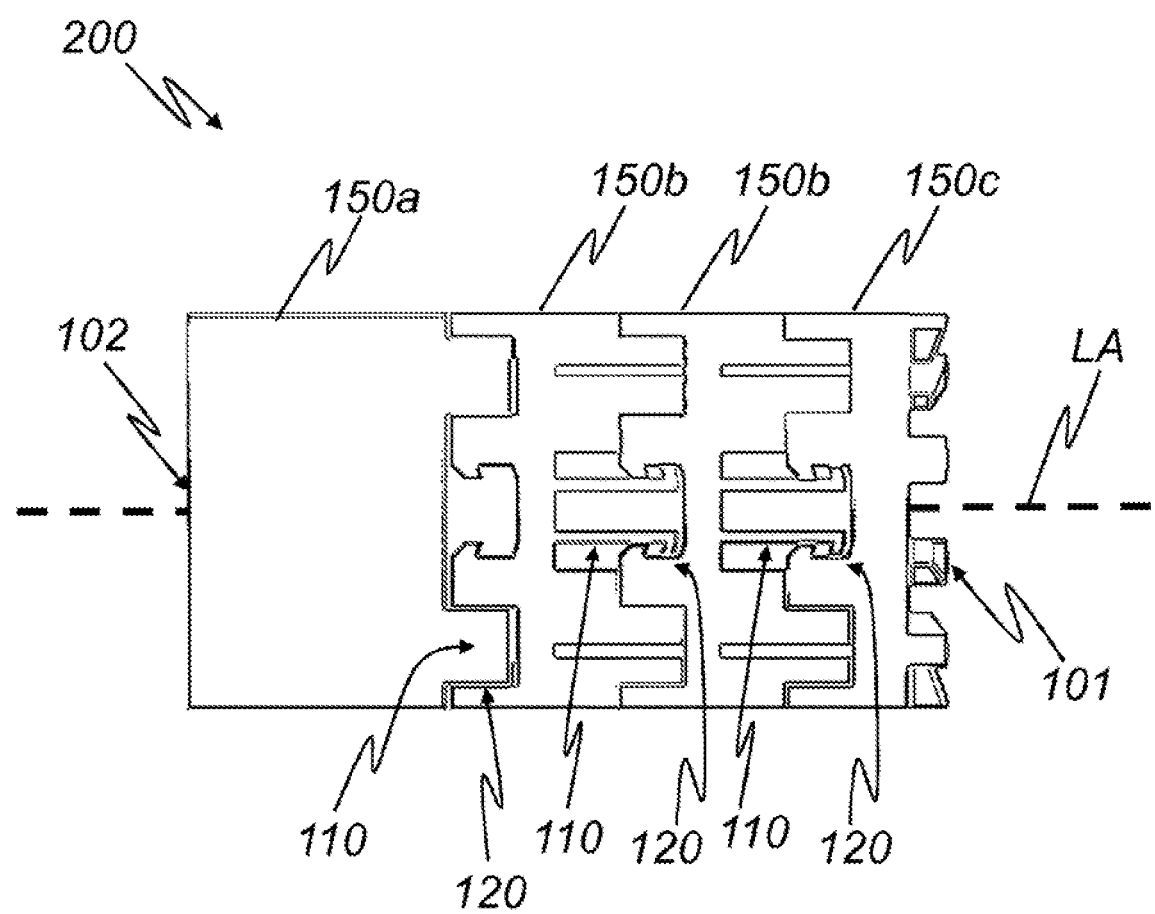

FIG. 3*a* shows schematic views of a cage of a module according to embodiments of the invention;

FIG. 3*b* show schematic perspective representations of the cage of FIG. 3*a*;

FIG. 3*c* show schematic perspective representations of the cage of FIG. 3*a*;

FIG. 4*a* shows schematic views of a further cage of a module according to embodiments of the invention;

FIG. 4*b* show schematic perspective representations of a further cage of a module of FIG. 4*a*;

FIG. 4*c* show schematic perspective representations of a further cage of a module of FIG. 4*a*;

FIG. 5 shows a schematic illustration of a drive system according to embodiments of the invention;

FIG. 6 shows a schematic representation of a production method according to embodiments of the invention; and FIG. 7 shows a schematic view of a drive system according to embodiments of the invention.

DETAILED DESCRIPTION

Figure 1:
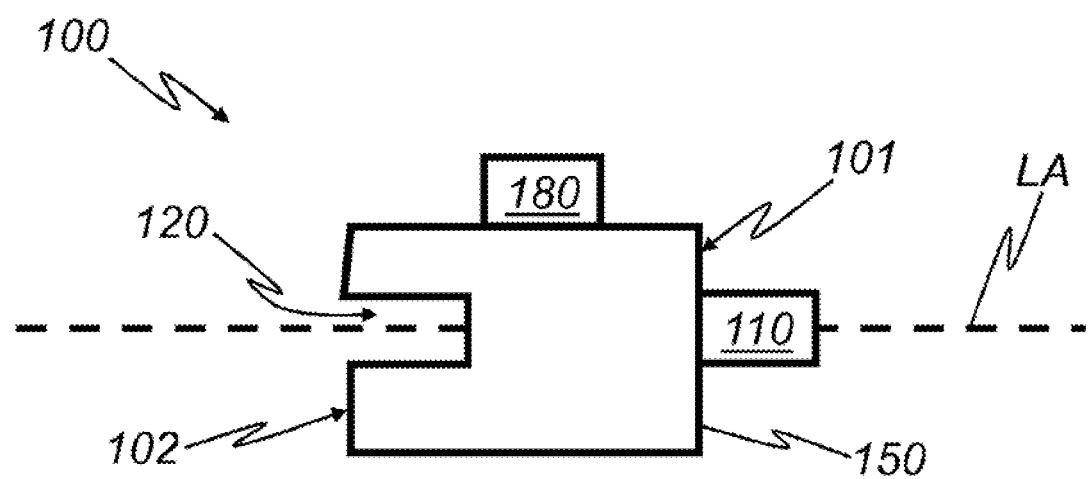
FIG. 1 shows a schematic representation of a module according to embodiments of the invention.

FIG. 1 shows a schematic illustration of a module 100 according to embodiments of the invention for a modular drive system. The module 100 comprises a front 101 side orthogonal to a longitudinal axis LA of the module 100 and a rear side 102 opposite the front side 101. At least one latching element 110, for example a locking lug, is arranged on the front side 101. On the rear side 102, there is at least one receiving element 120, which is complementary to the latching element 110, for example a depression which is complementary to the latching lug. A plurality of modules 100 can be arranged linearly one behind the other along the longitudinal axis LA and mechanically connected to one another, for example inserted into one another, via the latching elements 110 and receiving elements 120.

The module 100 shown comprises a cage 150 for receiving forces acting along the longitudinal axis LA. The cage 150 can contain at least one functional group of the drive system or parts thereof (not shown). The module 100 shown further comprises an anti-rotation element 180, for example a groove extending parallel to the longitudinal axis LA, for securing the module 100 against rotation about the longitudinal axis LA, for example on a housing of the drive system. The latching element 110, the receiving element 120 and/or the anti-rotation element 180 can be part of the cage 150.

Figure 2:
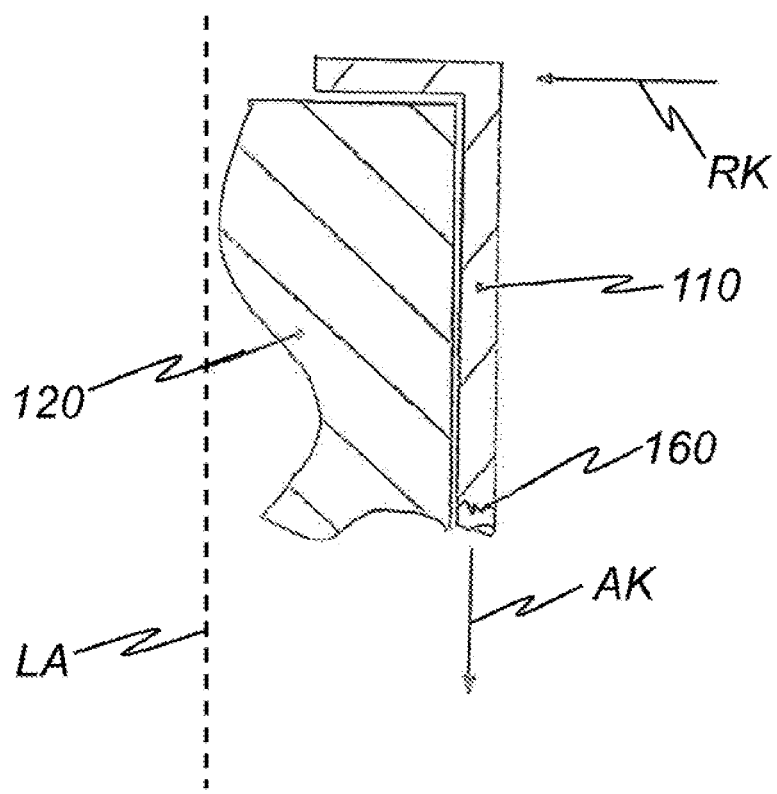
FIG. 2 shows a schematic detailed view of a connection between two modules.

FIG. 2 shows a schematic detailed view of a connection between two modules 100. A receiving element 120 of a first module 100 is shown in the form of a projection, against which a latching element 110 of the second module 100 rests in the form of a latching hook. The latching element 110 and the receiving element 120 are shaped in such a way that they interact in a form-fitting manner with respect to a movement relative to one another parallel to the longitudinal axis LA of the modules 100.

The latching element 110 comprises a predetermined breaking point 160, which is designed so that the axial force AK acting on the locking element 110 parallel to the longitudinal axis, at which the predetermined breaking point 160 breaks, is less than the necessary axial force to separate the latching element 110 from the receiving element 120. The connection of the modules 100 can additionally be secured by a radial force RK acting radially to the longitudinal axis on the latching element 110, which prevents the latching element 110 from bending away from the receiving element 110. The radial force RK can be applied, for example, in that the latching element 120 bears against a housing (not shown) of the drive system.

FIG. 3 shows schematic views of a cage 150 of a module 100 according to embodiments of the invention. FIG. 3*a* shows a schematic side view of the cage 150. The cage 150 shown comprises a number of latching elements 110 in the form of locking hooks, each having an undercut HS, on a front side 101 orthogonal to the longitudinal axis LA. On a rear side 102 opposite the front side 101, the cage 150 comprises a number of receiving elements 120 in the form of depressions complementary to the latching elements 110, which also have undercuts HS. The undercuts HS securely hold together cages 150 along the longitudinal axis LA against axial forces along the longitudinal axis LA.

The cage 150 shown comprises a number of anti-rotation elements 180 in the form of incisions parallel to the longitudinal axis LA, into which, for example, projections of a housing (not shown) of the drive device can engage to prevent rotation of the cage 150 about the longitudinal axis LA.

FIGS. 3b and 3c show schematic perspective representations of the cage 150 of FIG. 3a.

FIG. 4 shows schematic views of a further cage 150 of a module 100 according to embodiments of the invention. FIG. 4a shows a schematic side view of the cage 150. FIGS. 4b and 4c show schematic perspective representations of the cage 150 of FIG. 4a.

The cage 150 shown in FIG. 4 differs from the cage 150 shown in FIG. 3 in that it does not have any latching elements 110 on the front side 101. Due to the lack of the latching elements 110, a module 100 with such a cage 150 is particularly suitable as a terminating module at the beginning or at the end of a row of linearly connected modules 100 for a drive system along the longitudinal axis LA. For example, a housing (not shown) or another function group (not shown) of the drive system not carried by a module 100 can be connected to the front side 101 without latching elements 110. For a rotation-proof connection to the drive system, the cage 150 can have a number of anti-rotation elements 180, for example in the form of projections on the front side 101.

According to embodiments of the invention, it is also conceivable that a module 100 has latching elements 110 on its front side 101 but no receiving elements 120 on its rear side 102. Such a module 100 could form a termination module at an end of a row of modules 100 connected linearly one behind the other along their longitudinal axis LA opposite a cage 150 as shown in FIG. 4.

FIG. 5 shows a schematic illustration of a drive system 200 according to embodiments of the invention. The drive system 200 shown comprises a number of modules 100 arranged linearly one behind the other along their longitudinal axis LA. The modules 100 each comprise at least one functional group 170 of the drive system 200.

For example, a first module 100 according to the order of the modules 100 along the longitudinal axis LA includes a motor 171, for example an electric motor, and a transmission 172, in particular adapted to the motor 171. A second module 100 comprises, for example, a clutch 173, in particular an overload clutch for protecting a door (not shown) driven by the drive system 200, in particular a vehicle door, or a connection element (not shown), such as a ball stud, that connects the drive system 200 to the door from overload.

A drive system 200 according to embodiments of the invention can be designed particularly advantageously such that the overload clutch triggers when the load is less than a maximum load that can be absorbed by the door, the connecting element and the drive system 200 without damage. Furthermore, the drive system 200 is advantageously designed such that its maximum load is less than the respective maximum load on the door and the connecting element. This ensures that in the event of a malfunction or incorrect operation, it is not the door or the connecting element that is damaged, but rather only the drive system 200, which is generally easier to replace.

A third module 100 includes, for example, a brake 174, for example a disc brake. A fourth module comprises, for example, a further coupling 173, for example an elastic coupling for damping vibrations of the drive system 200 or a tappet to separate the brake 174 from the drive system 200. A fifth module 100 comprises, for example, a bearing 175, in particular for absorbing forces acting parallel to the longitudinal axis LA, and a threaded spindle 176 for moving a door (not shown). Other arrangements of the functional groups 170 are also conceivable within the scope of embodiments of the present invention.

FIG. 6 shows a schematic illustration of a production method 300 according to embodiments of the invention. The production method 300 shown comprises manufacturing 310 of modules 100, for example by installing generic functional groups 170 of a drive system 200 in cages 150 of modules 100, the cages 150 being produced, for example, by injection moulding. Manufacturing 310 may include marking 311 of manufactured modules 100, each with an individual mark, for example a QR code. In the example shown, manufacturing 310 is followed by storing 320 of modules 100, in particular for a storing period of more than 24 hours.

Testing 330 of the modules 100, for example by laser scanning, can follow the storing 320, for example. The result of the testing 330 can be documented and assigned, for example on the basis of the mark, to a specific module 100.

If the testing 330 shows that the modules 100 meet their specifications, the modules 100 can then be assembled 340 into a drive system 200. If testing 330 reveals that module 100 does not meet its specifications, reworking 331 and retesting 330 may be performed on module 100 until the specifications are met.

FIG. 7 shows a schematic view of a drive system 200 according to embodiments of the invention with four modules 100 arranged one behind the other along their longitudinal axis LA, of which only the cages 150a, 150b, 150c are shown for the sake of clarity. A first cage 150a has a flat rear side 102, for example for arrangement on an inner wall of a housing (not shown) of the drive system. On its front side opposite the rear side 102, the first cage 150a has a number of latching elements 110, which engage in receiving elements 120 on the rear side of a second cage 150b, and in particular thereby prevent the second cage 150b from rotating relative to the first cage 150a.

The second cage 150b and an adjoining third cage 150b are for example constructed the same way as the cage 150 shown in FIG. 3. Along the longitudinal axis LA, the third cage 150b is followed by a fourth cage 150c, which is constructed, for example, like the cage 150 shown in FIG. 4. The second cage 150b, the third cage 150b and the fourth cage 150c are interconnected by latching elements 110 on the front of the second cage 150b and third cage 150b and receiving elements 120 on the rear side of the third cage 150b and fourth cage 150c. The latching elements 110 engage, for example, in the receiving elements 120 such that the cages 150b, 150c are positively connected to one another with mechanical play along the longitudinal axis LA. Due to the mechanical play, the latching elements 110 can be easily inserted into the receiving elements 120 when the drive system 200 is assembled.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

REFERENCE SIGN LIST

100 Module
101 Front side
102 Rear side
110 Latching element
120 Receiving element
150 Cage
160 Predetermined breaking point
170 Functional group
171 Motor
172 Transmission
173 Clutch
174 Brake
175 Bearing
176 Threaded spindle
180 Anti-rotation element
200 Drive system
300 Production method
310 Manufacturing
311 Marking
320 Storing
330 Testing
331 Postprocessing
340 Assembling
AK axial force
LA longitudinal axis
RK radial force

The invention claimed is:

1. A modular, motorized drive system comprising a plurality of modules,
   a. wherein the plurality of modules are arranged linearly one behind another along a longitudinal axis of the plurality of modules forming a functional group of the modular, motorized drive system,
   b. wherein each of the plurality of modules comprises at least one of a number of latching elements on a front side orthogonal to the longitudinal axis and a number of receiving elements complementary to the latching elements on a rear side opposite the front side and orthogonal to the longitudinal axis,
   c. wherein the number of latching elements of a first module of the plurality of modules form a mechanical connection with the number of receiving elements of a second module of the plurality of modules adjacent to the first module along the longitudinal axis,
   d. wherein the number of latching elements of the first module and the number of receiving elements of the second module are designed to cooperate positively along the longitudinal axis to prevent loosening of the mechanical connection,
   e. wherein at least one of the number of latching elements and the number of receiving elements comprise at least one undercut against loosening of the mechanical connection along the longitudinal axis.

2. The modular, motorized drive system according to claim 1, wherein the number of latching elements comprise a number of latching lugs and the number of receiving elements comprise a number of depressions complementary to the number of latching lugs.

3. The modular, motorized drive system according to claim 1, wherein at least one of the plurality of modules comprises at least one separating element for a non-destructive disconnection of the mechanical connection.

4. The modular, motorized drive system according to claim 1, wherein at least one of the plurality of modules comprises a cage for receiving components of the at least one module, the cage comprising at least one of the number of latching elements and the number of receiving elements and being designed to absorb forces acting along the longitudinal axis.

5. The modular, motorized drive system according to claim 1, wherein the first module or the second module comprises at least one predetermined breaking point, wherein a breaking force of the predetermined breaking point is less than a release force that must be applied along the longitudinal axis to release the mechanical connection of the first module with the second module.

6. The modular, motorized drive system according to claim 1, wherein at least one of the plurality of modules comprises a number of anti-rotation elements for securing the at least one module on a housing of the modular, motorized drive system against rotation of the at least one module around the longitudinal axis, the number of anti-rotation elements comprising a number of at least one of grooves and projections.

7. The modular, motorized drive system according to claim 1, wherein the functional group is selected from:
   a. a motor;
   b. a transmission;
   c. a clutch;
   d. a brake;
   e. a bearing and
   f. a threaded spindle.

8. The modular, motorized drive system according to claim 1, wherein the plurality of modules correspond to one another with respect to the shape and arrangement of the number of latching elements and the number of receiving elements.

9. The modular, motorized drive system according to claim 1, wherein one of the plurality of modules comprises a threaded spindle and a bearing, the bearing being designed for absorbing forces acting along the longitudinal axis.

10. A production method for a modular, motorized drive system according to claim 1, the production method comprising at least the following steps:
   a. manufacturing the plurality of modules for the modular, motorized drive system;
   b. testing a function of the plurality of modules individually and
   c. assembling the plurality of modules after testing to form the modular, motorized drive system.

11. The production method according to claim 10, comprising the step of storing the plurality of modules after the step of manufacturing and before the step of assembling during a storage period at a storage temperature, the storage period being at least 24 hours.

12. The production method according to claim 11, wherein the step of testing is carried out before or after the step of storing.

13. The production method according to claim 10, wherein the step of assembling comprises a step of preloading the plurality of modules.

* * * * *